United States Patent [19]

Ellis

[11] 4,388,579

[45] Jun. 14, 1983

[54] CONTROL SYSTEM FOR A WOUND-ROTOR MOTOR

[75] Inventor: James N. Ellis, Chatsworth, Calif.

[73] Assignee: The United States of America as represented by the United States Department of Energy, Washington, D.C.

[21] Appl. No.: 284,158

[22] Filed: Jul. 17, 1981

[51] Int. Cl.³ .............................................. H02P 5/40
[52] U.S. Cl. ................................... 318/732; 318/822; 318/828; 323/343
[58] Field of Search ........ 318/780, 813, 808, 818–822, 318/812, 828, 826, 732, 731; 323/343

[56] References Cited

U.S. PATENT DOCUMENTS 3,426,260  2/1969  Lee et al. ............................ 318/828

OTHER PUBLICATIONS

Murphy, J. M. D., *Thyristor Control of AC Motors*, 1973, pp. 54–55.
Paice, D. A., "Speed Control of Large Induction Motors by Thyristor Converters", IEEE Trans. on Ind. and General Applications, vol. IGA-5, No. 5, Sep.-/Oct. 1969.

*Primary Examiner*—David Smith, Jr.

[57] ABSTRACT

A load switching circuit for switching two or more transformer taps under load carrying conditions includes first and second parallel connected bridge rectifier circuits which control the selective connection of a direct current load to taps of a transformer. The first bridge circuit is normally conducting so that the load is connected to a first tap through the first bridge circuit. To transfer the load to the second tap, a switch is operable to connect the second bridge circuit to a second tap, and when the second bridge circuit begins to conduct, the first bridge circuit ceases conduction because the potential at the second tap is higher than the potential at the first tap, and the load is thus connected to the second tap through the second bridge circuit. The load switching circuit is applicable in a motor speed controller for a wound-rotor motor for effecting tap switching as a function of motor speed while providing a stepless motor speed control characteristic.

15 Claims, 2 Drawing Figures

CONTROL SYSTEM FOR A WOUND-ROTOR MOTOR

CONTRACTUAL ORIGIN OF THE INVENTION

The United States Government has rights in this invention pursuant to Subcontract W-31-109-38-3870 with Rockwell International under Prime Contract W-31-109-ENG 38 between the U.S. Department of Energy and Argonne National Laboratory.

BACKGROUND OF THE INVENTION

This invention relates to circuit arrangements for switching transformer taps under load carrying conditions, and in particular to circuit arrangements of this type which are applicable to the type of motor speed control used with wound-rotor motors.

The Scherbius drive and the Kramer drive systems are commonly used for variable-speed motor control. Solid state Scherbius or Kramer drives control the speed of a wound-rotor motor by controlling the rotor current and at the same time returning the slip power, which would otherwise be wasted, to the primary power supply system. By regulating the current in the rotor winding, these systems control the motor torque and thus the motor speed.

It is known that the voltage induced in the rotor of an induction motor is maximum at start-up when the motor speed is zero, and decreases as the rotor speed increases. For example at 94% speed, the rotor voltage is only 6% of the maximum, or starting value. The control system must therefore handle a wide range of voltage.

Practical systems have been designed which reduce this voltage range in order to reduce the size and cost of the control system. One such arrangement employs an autotransformer to decrease the rotor voltage supplied to the control system at low rotor speeds and to increase the rotor voltage supplied to the control system at high rotor speeds.

The control system is connected to a low voltage tap of the autotransformer for operation from zero rotor speed to 70% rotor speed, for example. When the rotor reaches 70% speed and the rotor voltage has decreased to 30% of its initial, or zero speed, value, the control system is switched to a high voltage tap of the autotransformer to increase the voltage into the control system.

However, in known systems, the voltage on the autotransformer must be reduced to zero at the time of switching from the low voltage tap to the high voltage tap because it is not practical to attempt to switch the high currents involved, and also, severe transients would result. Consequently, during the switching period, power is disconnected from the motor for an interval of one to two seconds during which time the motor speed will decrease. During much of this interval, the motor torque is less than that required to hold the load. In an application for controlling the speed of a coolant pump motor in a nuclear reactor, for example, the total inertia is primarily that of the motor. In such application a speed drop of several percent can be expected during the switching interval. Thus, motor controllers which require the removal of power from the transformer during tap switching would be unsuitable in this application, or other applications which require a stepless speed control characteristic over the required speed range.

SUMMARY OF THE INVENTION

The present invention provides a load switching circuit arrangement for switching a load between different transformer taps under load carrying conditions, and which is particularly applicable to the type of motor speed control used with wound-rotor motors.

In accordance with the invention, the load switching circuit arrangement comprises: first rectifier means which is connected to a first tap of the transformer and has positive and negative terminals connected to a direct current load; a second normally non-conductive controlled rectifier means which is connected between the positive and negative terminals in parallel with the first rectifier means; a switch means which is interposed between the second rectifier means and a second tap of the transformer and operable, when a transfer is to be effected, to connect the second rectifier means to the second tap; and an enabling circuit means which initiates conduction of the second rectifier means after the switch means has connected the second rectifier means to the second tap.

The load is normally connected to the first tap through the first rectifier means which is normally conducting. When the switch means is operated, and the second rectifier means is enabled by the enabling circuit means, the load is connected to the second tap through the second rectifier means. When the second rectifier means begins conducting, the first rectifier means ceases conducting because the potential at the second tap is higher than the potential at the first tap. Consequently, the load is disconnected from the first tap.

When the enabling circuit means subsequently causes the second rectifier means to cease conducting, the first rectifier means immediately begins to conduct so that the load is reconnected to the first tap and is disconnected from the second tap.

The load is transferred between the first and second taps of the transformer without removing voltage from the transformer. Also, the switch means which connects the second rectifier means to the second transformer tap always switches on a dead circuit.

In accordance with another aspect of the invention, the load switching circuit arrangement provides tap switching under load carrying conditions for a transformer having any number of taps. For example, in an arrangement for a transformer having three taps, a first controlled rectifier means is normally connected to a first tap through a first switch means and enabled by enabling circuit means so that the direct current load is connected to the first tap. To transfer to the next higher tap, a second switch means is operated, connecting a second controlled rectifier means to the second, next higher, tap. Then, the enabling circuit means initiates conduction of the second rectifier means whereupon the load becomes connected to the second tap and the first rectifier means ceases to conduct. Transfer to the third, or highest, potential tap is effected by operating the first switch means to connect the first rectifier means to the third tap, and when the enabling circuit means initiates conduction of the first rectifier means, the load is connected to the third tap and the second rectifier means ceases conduction.

The load switching circuit arrangement is particularly applicable in a motor speed control circuit for a wound-rotor motor for effecting tap switching as a function of motor speed, while providing a stepless speed control characteristic for the motor. In such application, tap switching is effected at selected motor speeds as signalled by the closing of motor contactor switches, for example, without removing power from the motor or voltage from the transformer.

DESCRIPTION OF THE PREFERRED EMBODIMENTS

Figure 1:
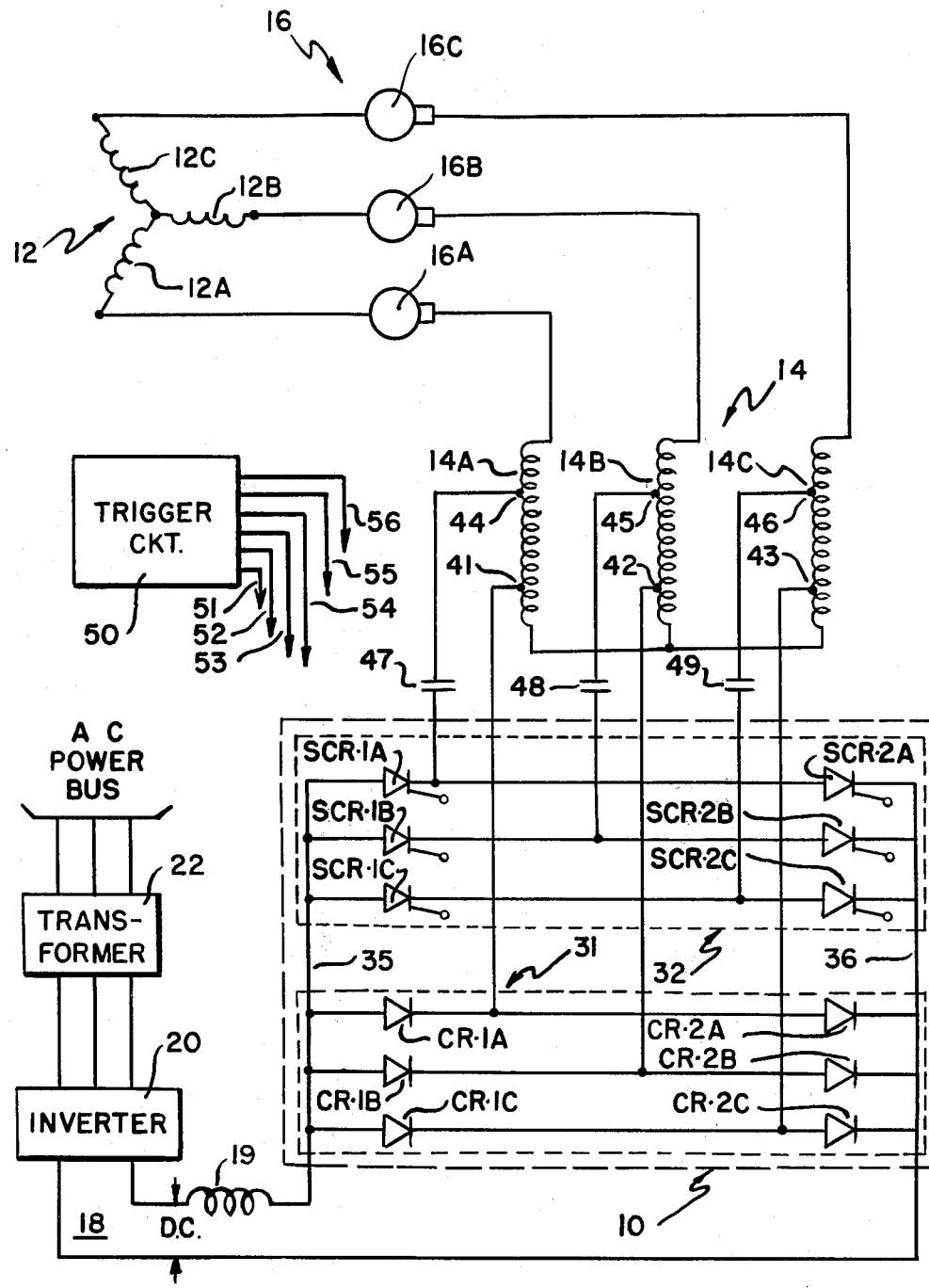
FIG. 1 is a schematic circuit and partial block diagram of a motor speed control system including the load switching circuit provided by this invention.

Referring to FIG. 1, the load switching circuit 10 provided by the present invention is shown connected for operation as the converter section of a variable speed drive system of the Scherbius or Kramerstat type drive systems for controlling the speed of a wound-rotor motor. The motor control circuit, including the load switching circuit 10, is particularly suitable for applications which require a stepless speed control characteristic throughout the required speed range. One example of such application is in the control of a drive motor for a primary sodium pump in a liquid sodium cooled nuclear plant. The system provides smooth, continuous speed control over the operating speed range with substantially complete recovery of slip power. Also, stepless speed control is provided since transformer tap switching is effected without removing power from the motor or voltage from the autotransformers 14, and there is no step as a result in the speed control characteristic of the drive.

The operation and structure of a basic Kramerstat or Scherbius type drive is well known and will not be described in detail. Briefly, the voltage induced in the rotor windings 12 of a wound-rotor induction motor is coupled to autotransformers 14 through slip rings 16. The rotor current is rectified by the load switching circuit 10, passed through a DC link 18, including a line reactor device 19, to an inverter 20 which converts the DC power into AC power. The inverted power is returned to the AC power source through a transformer stage 22. The rotating speed of the induction motor is controlled by controlling the inverter 20 by way of an input received from a speed regulator circuit (not shown).

The load switching circuit 10 includes a three-phase bridge circuit 31 which is the low voltage bridge section of the load switching circuit 10, and a three-phase bridge 32 which is the high voltage bridge section of the load switching circuit 10. The low voltage bridge 31 comprises three pairs of diodes CR1A-CR2A, CR1B-CR2B, and CR1C-CR2C, each diode pair corresponding to a different one of the three windings 12A, 12B, and 12C of the motor rotor. Each diode pair, such as diodes CR1A and CR2A, has its positive and negative terminals connected between a pair of conductors 35 and 36 which connect the output of the bridge circuit to the control system including the inverter 20 which serves as a direct current load for the load switching circuit 10. The junction of diodes CR1A and CR2A is connected to the low voltage tap 41 of autotransformer winding 14A which is coupled via slip ring 16A to winding 12A of the motor rotor windings. Similarly, the junctions of diode CR1B-CR2B, and CR1C-CR2C are connected to respective low voltage taps 42 and 43 of autotransformer windings 14B and 14C which are coupled through slip rings 16B and 16C to rotor windings 12B and 12C. Thus the low voltage bridge circuits 31 are directly connected to the autotransformer windings 14A-14C.

The high voltage bridge circuit 32 includes three pairs of controlled switching devices, illustrated as silicon-controlled rectifiers SCR1A-SCR2A, SCR1B-SCR2B, and SCR1C-SCR2C which are connected between the conductors 35 and 36 and are thus in parallel with the low voltage bridge circuit 31. The junction of silicon-controlled rectifiers SCR1A and SCR2A is connected through a speed contactor switch 47 to the high voltage tap 44 of autotransformer winding 14a. Similarly, the junction of silicon-controlled rectifiers SCR1B and SCR2B is connected by normally open speed contactor switch 48 to the high voltage tap 45 of autotransformer winding 14B, and the junction of silicon-controlled rectifiers SCR1C and SCR2C is connected through normally open speed contactor switch 49 to the high voltage tap 46 of autotransformer winding 14C. Thus, the high voltage bridge circuit 32 is normally disconnected from the autotransformers. The contactor switches 47-49 are operated when the motor rotor reaches the transfer speed, such as 70% of its maximum speed, at which time transfer from the low voltage taps 41-43 to the high voltage taps 44-46 is to occur.

A trigger circuit 50, which has its outputs 51-56 connected to the gates of the six silicon-controlled rectifiers of the high voltage bridge 32, generates trigger signals to gate on the silicon-controlled rectifiers, in pairs, near zero crossovers of the AC phase signals, in a manner known in the art of three-phase control circuits. The trigger circuit 50 is enabled to generate its gating signals in response to a signal indicative of the speed of the motor. The motor speed signal may be derived, for example, from the rotor voltage which varies as a function of rotor speed.

Operation

When the motor starts, the high voltage bridge 32 is initially disconnected from the autotransformers 14 by the normally open contactor switches 47-49. The low voltage diode bridge 31 rectifies the rotor current in the normal manner until the motor has accellerated to the speed at which a transfer is to be made from the low voltage transformer taps 41-43 to the high voltage taps 44-46. At such time, the speed contactor switches 47-49 close connecting the high voltage bridge 32 to the autotransformers 14. Then, the trigger circuit 50 is enabled to generate trigger signals to gate on the SCR devices SCR1A-SCR2A, SCR1B-SCR2B and SCR1C-SCR2C, in pairs, as a function of the phase of the rotor current. The high voltage bridge 32 then functions as a diode bridge. Because the rectified voltage provided by the high voltage bridge 32 is higher than the AC voltage supplied to the low voltage bridge 31, the low voltage bridge no longer conducts. Thus, the transfer from the low voltage taps 41-43 to the high voltage taps 44-46 is effected while the autotransformers 14 are energized. It is pointed out that the contactor switches 47-49 always switch on a dead circuit and never break current.

The transfer from the high voltage taps 44-46 to the low voltage taps 41-43 when the motor speed is decreasing is effected in a similar manner. As the motor speed decreases and reaches the transfer point, the trigger circuit 50 is disabled. Since gating signals for the silicon-controlled rectifiers of the high voltage bridge 32 are no longer provided, they immediately cease to conduct. When the silicon-controlled rectifiers stop conducting, the lower voltage rectifier bridge 31 rectifies once again and the resultant DC voltage supplied to the control system is lowered. The contactor switches 47–49 which connected the SCR high voltage bridge to the autotransformer taps is opened to protect the high voltage bridge 32 from the maximum voltage that will occur when the motor stops.

Multiple Switching Arrangement

Figure 2:
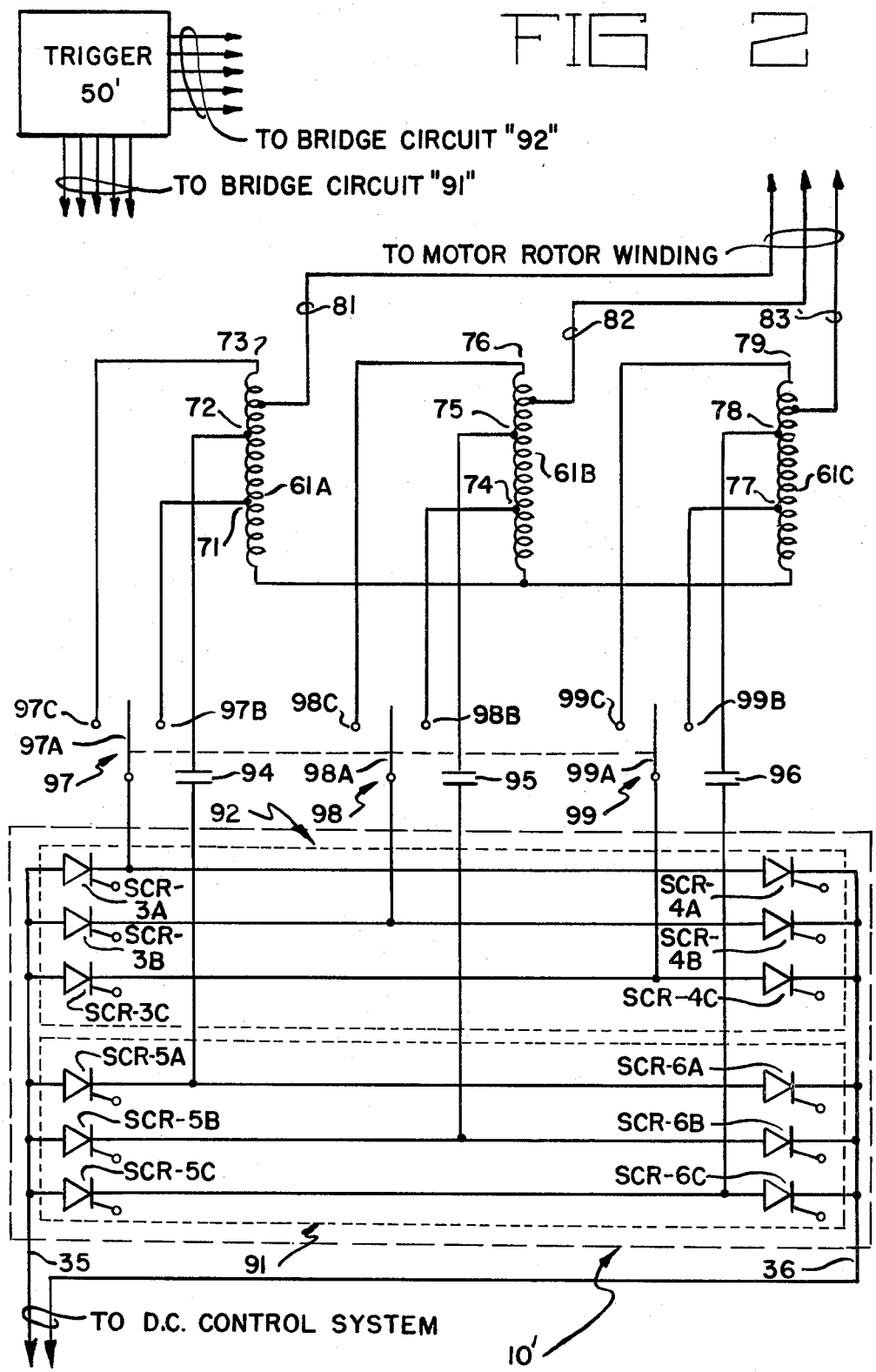
FIG. 2 is a schematic circuit diagram of a load switching circuit provided by the present invention, which provides for switching between three levels of transformer taps.

Referring to FIG. 2, the motor control circuit illustrated provides for switching between three levels of autotransformer taps. Only the autotransformers 61A–61C and the load switching circuit 10' are illustrated in FIG. 2 because the remaining elements of the motor speed control circuit are the same as those illustrated in FIG. 1.

Autotransformer 61A has three taps including a low voltage tap 71, an intermediate voltage tap 72, and a high voltage tap 73. Autotransformer 61B has corresponding taps 74, 75, and 76, and autotransformer 61C has taps 77, 78, and 79. Each of the autotransformers 61A, 61B, and 61C is coupled to a different one of the phase windings of the motor rotor through conductors 81–83 and slip rings (not shown) in the manner illustrated for the circuit of FIG. 1.

The load switching circuit 10' employs two three-phase bridge networks 91 and 92, both of which include controllable switching devices illustrated as silicon-controlled rectifiers. Bridge 92, which connects the low voltage taps 71, 74, and 77 and the high voltage taps 73, 76, and 79 to the control system, includes silicon-controlled rectifiers SCR3A–SCR4A, SCR3B–SCR4B, and SCR3C–SCR4C which are connected in pairs between conductors 35 and 36 which connect the output of the bridge circuit 92 to the control system. Three transfer switches 97, 98, and 99 are operable to connect the A, B, and C, phase branches of the bridge circuit 92 to respective low voltage taps 71, 74, and 77 or to the respective high voltage taps 73, 76, and 79.

The bridge circuit 91, which connects the intermediate voltage taps 72, 75, and 78 to the control system includes silicon-controlled rectifier pairs SCR5A–SCR6A, SCR5B–SCR6B, and SCR5C–SCR6C which are connected in pairs between conductors 35 and 36 and thus in parallel with bridge network 92.

Three normally open motor speed contactor switches 94, 95, and 96 are operable to connect the intermediate voltage taps 72, 75, and 78 to the respective A, B, and C phase branches of the bridge network 91.

A trigger circuit 50' is operable to generate gating signals for the six silicon-controlled rectifiers of bridge 91, or alternatively for the six silicon-controlled rectifiers of bridge 92 as a function of the speed of the motor rotor. The gating signals enable each pair of silicon-controlled rectifiers to be gated on in the proper phase sequence when its bridge circuit is connected to one of the autotransformer taps. The transfer switches 97, 98, and 99 may be speed responsive associated with and operated by the motor, or the switches may be operated under the control of a switching circuit (not shown) which in turn is controlled by a speed indicative signal derived from the rotor voltage and operates the transfer switches 97–99 to move the switch arms, such as switch arm 97A for switch 97, to engage contact 97B, connecting bridge network 92 to the low voltage tap 71 when the motor is started. The switches 97–99 will open after switching to the intermediate taps 72, 75, and 78 has been effected under the control of contactor switches 94–96 and bridge network 91 is conducting when the intermediate speed, say 40% of the maximum rotor speed has been reached. The transfer switches 97–99 will be operated to connect bridge circuit 92 to the high voltage taps 73, 76, and 79 when the high voltage transfer point, say 70% of the maximum rotor speed is reached.

The load switching circuit 10' illustrated in FIG. 2 provides for switching between three levels of autotransformer taps. By using two, two-position transfer switches with the two SCR bridge circuits 91 and 92, four autotransformer taps can be switched. In such arrangement, the three contactor switches 94, 95, and 96 would each be replaced by a separate two-position transfer switch. For example, with reference to FIG. 2, a two-position transfer switch replacing contactor switch 94 would have one contact connected to tap 72 and its other contacts connected to a further tap (not shown) which would be the low voltage tap for autotransformer winding 61A. Moreover, six autotransformer taps can be switched by using two, three-position transfer switches with the two SCR bridge circuits 91 and 92.

Operation

Before the motor is started, the transfer switches 97–99 and contactor switches 94–96 are open as illustrated in FIG. 2, and thus both bridges 91 and 92 are disconnected from the autotransformer taps. When the motor is started, transfer switches 97–99 are operated, connecting bridge circuit 92 to the low voltage taps 71, 74, and 77 of the autotransformer winding 61A, 61B, and 61C. Then, trigger pulses provided by trigger circuit 50' are supplied to the gates of the silicon-controlled rectifiers SCR3A–SCR4A, SCR3B–SCR4B, and SCR3C–SCR4C of bridge circuit 92, and the bridge circuit 92 rectifies the rotor current and provides DC current to the control system over the outputs of the load switching circuit 10'.

When the motor reaches its intermediate speed, contactor switches 94, 95, and 96 are operated closed connecting bridge circuit 91 to the intermediate taps 72, 75, and 78 of the autotransformers 61. The silicon-controlled rectifiers SCR5A–SCR6A, SCR5B–SCR6B, and SCR5C–SCR6C are then gated on by trigger pulses provided by trigger circuit 50' and the bridge circuit 91 begins to rectify. Consequently, no current flows in bridge circuit 92 after bridge circuit 91 begins to rectify. At such time, trigger circuit 50' stops providing gating signals to the silicon-controlled rectifiers of bridge circuit 92, and then transfer switches 97–99 are operated to disconnect bridge circuit 92 from the low voltage taps 71 from 74 and 77.

When the motor speed reaches the point where transfer from the intermediate taps 72, 75, and 78 to the high voltage taps 73, 76, and 79 is to be effected, the transfer switches 97–99 are operated to connect bridge circuit 92 to the high voltage taps 73, 76, and 79. The silicon-controlled rectifiers of bridge circuit 92 are then gated on by trigger pulses provided by trigger circuit 50' and the bridge circuit 92 begins to rectify the rotor current. Because the rectified voltage is then higher than the AC voltage at the intermediate taps 72, 75, and 78, the intermediate rectifier bridge circuit 91 no longer passes current.

The gating signals are then removed from the silicon-controlled rectifiers of bridge circuit 91 and contactor switches 94–96 are opened to disconnect the bridge circuit 91 from the intermediate voltage taps When the motor speed is being reduced, the control steps are reversed with a transfer being effected from the high voltage taps 73, 76, and 79 to the intermediate taps 72, 75, and 78 for which condition bridge circuit 91 conducts and bridge circuit 92 is disconnected from the circuit. When the motor speed has decreased to the low speed transfer point, bridge circuit 92 is connected to the low voltage taps 71, 74, and 77 through transfer switches 97, 98, and 99, and bridge circuit 91 is disconnected from the intermediate voltage taps 72, 75, and 78. Just before the motor stops, gating signals are removed from the silicon-controlled rectifiers for bridge circuit 92, and transfer switches 97–99 are open to protect the bridge circuit 92 from the maximum voltage that will occur when the motor stops.

The embodiments of the invention in which an exclusive property or privilege is claimed are defined as follows:

1. In a load switching arrangement for selectively connecting a direct current load to at least first and second taps of a winding of a transformer, a load switching circuit means comprising:
    first recitifier means connected to said first tap of said transformer winding and having positive and negative terminals connected to said direct current load;
    second normally non-conducting controlled rectifier means connected between said positive and negative terminals in parallel with said first recitifier means;
    switch means interposed between said second rectifier means and said second tap of said transformer winding and operable to connect said second recitifer means to said second tap;
    and enabling circuit means for initiating conduction of said second rectifier means after said switch means is operated;
    said load being connected to said first tap through said first rectifier means when said first rectifier means is conducting, and said load being connected to said second tap through said second rectifier means when said second recitifier means is conducting, the potential at said second tap being higher than the potential at said first tap whereby said first rectifier means is rendered non-conducting, disconnecting the load from said first tap, when said second rectifier means is conducting.

2. A load switching arrangement according to claim 1 wherein said first rectifier means comprises first and second current rectifier devices which are connected in series between said positive and negative terminals and wherein said first tap is connected directly to a junction of said first and second rectifier devices.

3. A load switching arrangement according to claim 1 wherein said first rectifier means comprises first and second controlled current rectifier devices which are connected in series between said positive and negative terminals, and further switch means connecting said first tap to a junction of said first and second rectifier devices, said enabling circuit means enabling said first and second rectifier devices to conduct when said second rectifier means is non-conducting.

4. A load switching arrangement according to claim 3 wherein said transformer has a third tap, at a potential higher than said second tap, said further switch means being operable to disconnect said first tap from the junction of said first and second rectifier devices and to connect said third tap to the junction of said first and second rectifier devices whereupon said enabling means initiates conduction of said first and second rectifier devices, causing the load to be connected to said third tap, and said second rectifier means being rendered non-conducting whereby the load is disconnected from said second tap.

5. A load switching arrangement according to claim 1 wherein said enabling circuit means is controllable to cause said second rectifier means to cease conducting, allowing said first rectifier means to conduct whereby the load is reconnected to said first tap and is disconnected from said second tap.

6. In a load switching arrangement for selectively connecting a direct current load to at least first and second taps of a winding of a transformer under load carrying conditions, a load switching circuit means comprising:
    first circuit means including first rectifier means having positive and negative terminals connected to said direct current load, said first circuit means being connected to said first tap of said transformer winding and said first recitifer means normally conducting whereby the load is connected to said first tap through said first circuit means;
    second circuit means including second controlled rectifier means connected between said positive and negative terminals in parallel with said first recitifier means and being maintained non-conducting in the absence of enabling signals, and switch means interposed between said second rectifier means and said second tap of said transformer winding and operable to connect said second rectifier means to said second tap while said second rectifier means is non-conducting;
    and enabling circuit means for generating enabling signals for initiating conduction of said second rectified means after said switch means is operated;
    said direct current load being connected to said second tap through said second circuit means when said second rectifier means is conducting, and said second tap being at a higher potential than said first tap whereby said first rectifier means ceases conducting and disconnects the load from said first tap when said second rectifier means is conducting, and upon termination of said enabling signals, said second rectifier means ceases to conduct, allowing said first rectifier means to conduct whereby the load is reconnected to said first tap and is disconnected from said second tap.

7. A load switching arrangement according to claim 6 wherein said transformer has a plurality of taps including said first and second taps and at least a third tap which is at a potential higher than that for said second tap, and wherein said first rectifier means comprises further controlled rectifier means, and said first circuit means includes further switch means for selectively connecting said further controlled rectifier means to said first and third taps, said enabling signals being effective to initiate conduction of said further controlled rectifier means when it is connected to said third tap while said first-mentioned controlled rectifier means is conducting, and said enabling signals being ineffective in initiating conduction of said further controlled rectifier means when it is connected to said first tap while said first-mentioned controlled rectifier means is conducting.

8. A load switching arrangement according to claim 6 wherein said first rectifier means comprises first and second current rectifier devices which are connected in series between said positive and negative terminals, said first tap being connected directly to a junction of said first and second rectifier devices, and wherein said second rectifier means comprises first and second controlled current rectifier devices which are connected in series between said positive and negative terminals, said switch means being operable to connect said second tap to a junction of said first and second controlled rectifier devices.

9. A load switching arrangement according to claim 6 wherein said transformer has a third tap, the potential at said third tap being higher than the potential at said second tap, and said first rectifier means including first and second rectifier devices connected in series between said positive and negative terminals, and said second rectifier means comprising third and fourth rectifier devices connected in series between said positive and negative terminals, said switch means being operable to connect a junction of said third and fourth rectifier devices to said second tap, and said first circuit means comprising further switch means operable to selectively connect a junction of said first and second rectifier devices to said first and third rectifier devices to said first and third taps, and said enabling signals initiating conduction of the rectifier devices connected to the tap at the highest potential.

10. In a drive circuit for a wound-rotor motor in which rotor current is converted into direct current and reconverted into alternating current from regeneration to the AC power source for the motor, a load switching circuit means for selectively connecting an inverter circuit to at least first and second taps of a winding of a transformer, and for rectifying rotor current supplied through the transformer to provide direct current to a direct current load, including the inverter circuit, said load switching circuit comprising:

first rectifier means connected to said first tap of said transformer winding and having positive and negative terminals connected to said direct current load;

second normally non-conducting controlled rectifier means connected between said positive and negative terminals in parallel with said first recitifer means;

switch means interposed between said second rectifier means and said second tap of said transformer winding and operable to connect said second rectifier means to said second tap;

and enabling circuit means for initiating conduction of said second rectifier means after said switch means is operated;

said load being connected to said first tap through said first rectifier means when said first rectifier means is conducting, and said load being connected to said second tap through said second rectifier means when said second rectifier means is conducting, the potential at said second tap being higher than the potential at said first tap whereby said first rectifier means is rendered non-conducting, disconnecting the load from said first tap, when said second rectifier means is conducting.

11. A load switching arrangement according to claim 10 wherein said first rectifier means comprises first and second current rectifier devices which are connected in series between said positive and negative terminals and wherein said first tap is connected directly to a junction of said first and second rectifier devices.

12. A load switching arrangement according to claim 10 wherein said first rectifier means comprises first and second controlled rectifier devices which are connected in series between said positive and negative terminals, and further switch means connecting said first tap to a junction of said first and second rectifier devices, said enabling circuit means enabling said first and second rectifier devices to conduct when said second rectifier means is non-conducting.

13. A load switching arrangement according to claim 12 wherein said transformer has a third tap, the potential at said third tap being higher than the potential at said second tap, and said further switch means being operable to disconnect said first tap from the junction of said first and second rectifier devices and to connect said third tap to the junction of said first and second rectifier devices whereupon said enabling means initiates conduction of said first and second rectifier devices, causing the load to be connected to said third tap, and said second rectifier means being rendered non-conducting whereby the load is disconnected from said second tap.

14. A load switching arrangement according to claim 13 wherein at least said first-mentioned switch means is associated with the motor and operated to connect said second rectifier means to said second tap when the speed of the motor rotor reaches a given value.

15. A load switching arrangement according to claim 14 wherein said second switch means is operated to connect the first tap to the junction of said first and second rectifier devices when the rotor speed is less than said given value, and is operated to connect the third tap to said junction when the rotor speed reaches a preselected value which is greater than said given value.

* * * * *